US008464247B2

(12) United States Patent
Laska et al.

(10) Patent No.: US 8,464,247 B2
(45) Date of Patent: *Jun. 11, 2013

(54) METHODS AND SYSTEMS FOR DYNAMICALLY GENERATING INSTALLATION CONFIGURATION FILES FOR SOFTWARE

(75) Inventors: James Laska, Cary, NC (US); Will Woods, Cary, NC (US); Milan Zazrivec, Varin (SK)

(73) Assignee: Red Hat, Inc., Raleigh, NC (US)

( * ) Notice: Subject to any disclaimer, the term of this patent is extended or adjusted under 35 U.S.C. 154(b) by 1459 days.

This patent is subject to a terminal disclaimer.

(21) Appl. No.: 11/766,237

(22) Filed: Jun. 21, 2007

(65) Prior Publication Data

US 2008/0320473 A1 Dec. 25, 2008

(51) Int. Cl.
*G06F 9/445* (2006.01)

(52) U.S. Cl.
USPC ............................ 717/175; 717/176; 717/177

(58) Field of Classification Search
USPC ........................................ 717/176, 175, 177
See application file for complete search history.

(56) References Cited

U.S. PATENT DOCUMENTS

| | | | |
|---|---|---|---|
| 5,787,246 A | 7/1998 | Lichtman et al. | |
| 5,835,719 A | 11/1998 | Gibson et al. | |
| 5,948,062 A | 9/1999 | Tzelnic et al. | |
| 6,105,100 A | 8/2000 | Dean et al. | |
| 6,199,204 B1 * | 3/2001 | Donohue | 717/178 |
| 6,212,585 B1 | 4/2001 | Chrabaszcz | |
| 6,243,747 B1 | 6/2001 | Lewis et al. | |
| 6,272,536 B1 | 8/2001 | van Hoff et al. | |
| 6,314,565 B1 * | 11/2001 | Kenner et al. | 717/171 |
| 6,381,742 B2 | 4/2002 | Forbes et al. | |
| 6,405,309 B1 * | 6/2002 | Cheng et al. | 713/1 |
| 6,415,289 B1 | 7/2002 | Williams et al. | |
| 6,438,711 B2 | 8/2002 | Woodruff | |
| 6,449,642 B2 * | 9/2002 | Bourke-Dunphy et al. | 709/222 |
| 6,516,427 B1 | 2/2003 | Keyes et al. | |
| 6,526,442 B1 | 2/2003 | Stupek et al. | |
| 6,532,543 B1 | 3/2003 | Smith et al. | |
| 6,550,021 B1 | 4/2003 | Dalphy et al. | |
| 6,557,169 B1 | 4/2003 | Erpeldinger | |
| 6,594,664 B1 | 7/2003 | Estrada et al. | |
| 6,625,742 B1 | 9/2003 | Owhadi et al. | |

(Continued)

OTHER PUBLICATIONS

Cons et al., Automating Linux Installations at CERN, 2000.*

(Continued)

*Primary Examiner* — Phillip H Nguyen
(74) *Attorney, Agent, or Firm* — Lowenstein Sandler LLP

(57) ABSTRACT

The present invention provides methods and systems for dynamically generating configuration files used in installing software distributions and software installation testing. In particular, the present invention employs a framework comprising an API to discover and monitor an inventory of distributions, a set of templates for the configuration files, and plugins that may be selectively invoked to customize the configuration files. When performing installation testing, a server will access the distribution inventory and select appropriate templates that are to be part of the test. The server will then automatically generate the installation configuration files from the templates. The server may also execute one or more plugins that customize the configuration files as desired. Small client applications run on the target machines of the installation tests and are used to download the configuration files and the distributions. The present invention may also employ a scheduling service to coordinate the operations of the server and target machines.

18 Claims, 2 Drawing Sheets

U.S. PATENT DOCUMENTS

| | | |
|---|---|---|
| 6,686,838 B1 | 2/2004 | Rezvani et al. |
| 6,751,659 B1 | 6/2004 | Fenger et al. |
| 6,757,837 B1 | 6/2004 | Platt et al. |
| 6,766,364 B2 | 7/2004 | Moyer et al. |
| 6,769,022 B1 | 7/2004 | DeKoning et al. |
| 6,772,083 B2* | 8/2004 | Muller et al. ............... 702/123 |
| 6,779,004 B1 | 8/2004 | Zintel |
| 6,845,464 B2 | 1/2005 | Gold |
| 6,865,737 B1 | 3/2005 | Lucas et al. |
| 6,947,939 B2 | 9/2005 | Fujibayashi et al. |
| 6,986,033 B2 | 1/2006 | Miyamoto et al. |
| 7,013,461 B2 | 3/2006 | Hellerstein et al. |
| 7,024,327 B1* | 4/2006 | Dastidar et al. ............... 702/117 |
| 7,051,101 B1 | 5/2006 | Dubrovsky et al. |
| 7,065,533 B2* | 6/2006 | Arrouye et al. ............... 717/115 |
| 7,107,330 B1 | 9/2006 | Hamilton et al. |
| 7,124,401 B2* | 10/2006 | Muller et al. ............... 717/124 |
| 7,133,822 B1 | 11/2006 | Jacobson |
| 7,165,109 B2 | 1/2007 | Chiloyan et al. |
| 7,171,659 B2 | 1/2007 | Becker et al. |
| 7,185,071 B2 | 2/2007 | Berg et al. |
| 7,200,845 B2 | 4/2007 | Morrison et al. |
| 7,203,745 B2 | 4/2007 | Sheehy et al. |
| 7,249,354 B2* | 7/2007 | Tigani et al. ............... 717/177 |
| 7,340,637 B2 | 3/2008 | Nagoya |
| 7,350,112 B2 | 3/2008 | Fox et al. |
| 7,352,853 B1* | 4/2008 | Shen et al. ............... 379/201.12 |
| 7,356,679 B1 | 4/2008 | Le et al. |
| 7,395,322 B2 | 7/2008 | Harvey et al. |
| 7,478,361 B2* | 1/2009 | Peteanu et al. ............... 717/102 |
| 7,496,890 B2* | 2/2009 | Miller et al. ............... 717/107 |
| 7,499,933 B1* | 3/2009 | Simpson ............... 1/1 |
| 7,506,040 B1 | 3/2009 | Rabe et al. |
| 7,506,151 B2 | 3/2009 | Miyamoto et al. |
| 7,516,218 B2 | 4/2009 | Besson |
| 7,519,691 B2 | 4/2009 | Nichols et al. |
| 7,574,481 B2 | 8/2009 | Moore et al. |
| 7,600,005 B2 | 10/2009 | Jamkhedkar et al. |
| 7,606,868 B1 | 10/2009 | Le et al. |
| 7,640,325 B1 | 12/2009 | DeKoning et al. |
| 7,681,080 B2 | 3/2010 | Abali et al. |
| 7,716,316 B2 | 5/2010 | Nichols et al. |
| 7,734,717 B2 | 6/2010 | Saarimaki et al. |
| 7,774,774 B1* | 8/2010 | Mulligan et al. ............... 717/174 |
| 7,802,247 B1 | 9/2010 | Weathersby et al. |
| 7,827,261 B1 | 11/2010 | Griswold et al. |
| 7,831,968 B1 | 11/2010 | Weathersby et al. |
| 7,831,997 B2 | 11/2010 | Eldar et al. |
| 7,937,437 B2 | 5/2011 | Fujii |
| 8,103,776 B2 | 1/2012 | DeHaan et al. |
| 8,132,166 B2 | 3/2012 | DeHaan et al. |
| 8,185,891 B2 | 5/2012 | DeHaan et al. |
| 8,244,836 B2 | 8/2012 | DeHaan et al. |
| 8,326,972 B2 | 12/2012 | DeHaan et al. |
| 2002/0062259 A1 | 5/2002 | Katz et al. |
| 2002/0078186 A1 | 6/2002 | Engel et al. |
| 2002/0082846 A1* | 6/2002 | Chang et al. ............... 705/1 |
| 2002/0138567 A1 | 9/2002 | Ogawa |
| 2002/0162028 A1 | 10/2002 | Kennedy |
| 2003/0005097 A1 | 1/2003 | Barnard et al. |
| 2003/0055919 A1 | 3/2003 | Fong et al. |
| 2003/0069884 A1 | 4/2003 | Nair et al. |
| 2003/0069946 A1 | 4/2003 | Nair et al. |
| 2003/0070110 A1 | 4/2003 | Aija et al. |
| 2003/0074549 A1 | 4/2003 | Paul et al. |
| 2003/0110173 A1 | 6/2003 | Marsland |
| 2003/0119480 A1 | 6/2003 | Mohammed |
| 2003/0126585 A1 | 7/2003 | Parry |
| 2003/0195921 A1 | 10/2003 | Becker et al. |
| 2003/0212992 A1 | 11/2003 | Ronning et al. |
| 2003/0221094 A1* | 11/2003 | Pennarun ............... 713/1 |
| 2004/0006616 A1 | 1/2004 | Quinn et al. |
| 2004/0015831 A1 | 1/2004 | Bowhill |
| 2004/0015957 A1* | 1/2004 | Zara et al. ............... 717/174 |
| 2004/0019876 A1 | 1/2004 | Dravida et al. |
| 2004/0024984 A1 | 2/2004 | Lanzatella et al. |
| 2004/0044643 A1 | 3/2004 | deVries et al. |
| 2004/0054789 A1 | 3/2004 | Breh et al. |
| 2004/0059703 A1 | 3/2004 | Chappell et al. |
| 2004/0064501 A1 | 4/2004 | Jan et al. |
| 2004/0128375 A1 | 7/2004 | Rockwell |
| 2004/0143664 A1 | 7/2004 | Usa et al. |
| 2004/0167975 A1 | 8/2004 | Hwang et al. |
| 2004/0215755 A1 | 10/2004 | O'Neill |
| 2004/0223469 A1 | 11/2004 | Bahl et al. |
| 2004/0268298 A1* | 12/2004 | Miller et al. ............... 717/106 |
| 2005/0028025 A1 | 2/2005 | Zalewski et al. |
| 2005/0050175 A1* | 3/2005 | Fong et al. ............... 709/220 |
| 2005/0081186 A1* | 4/2005 | Tigani et al. ............... 717/101 |
| 2005/0114474 A1 | 5/2005 | Anderson et al. |
| 2005/0125525 A1 | 6/2005 | Zhou et al. |
| 2005/0177829 A1 | 8/2005 | Vishwanath |
| 2005/0182796 A1 | 8/2005 | Chu et al. |
| 2005/0198629 A1 | 9/2005 | Vishwanath |
| 2005/0223374 A1 | 10/2005 | Wishart et al. |
| 2006/0041767 A1 | 2/2006 | Maxwell et al. |
| 2006/0075001 A1* | 4/2006 | Canning et al. ............... 707/203 |
| 2006/0080659 A1 | 4/2006 | Ganji |
| 2006/0095230 A1 | 5/2006 | Grier et al. |
| 2006/0095702 A1 | 5/2006 | Hickman et al. |
| 2006/0155857 A1 | 7/2006 | Feenan et al. |
| 2006/0173912 A1 | 8/2006 | Lindvall et al. |
| 2006/0174018 A1 | 8/2006 | Zhu et al. |
| 2006/0190575 A1 | 8/2006 | Harvey et al. |
| 2006/0190773 A1 | 8/2006 | Rao et al. |
| 2006/0200658 A1 | 9/2006 | Penkethman |
| 2006/0212547 A1* | 9/2006 | Deleu et al. ............... 709/220 |
| 2006/0215575 A1 | 9/2006 | Horten et al. |
| 2006/0218544 A1 | 9/2006 | Chakraborty et al. |
| 2006/0230165 A1 | 10/2006 | Zimmer et al. |
| 2006/0282479 A1 | 12/2006 | Johnson et al. |
| 2007/0015538 A1 | 1/2007 | Wang |
| 2007/0067419 A1 | 3/2007 | Bennett |
| 2007/0101118 A1 | 5/2007 | Raghunath et al. |
| 2007/0118654 A1* | 5/2007 | Jamkhedkar et al. ............... 709/226 |
| 2007/0168721 A1 | 7/2007 | Luiro et al. |
| 2007/0169093 A1 | 7/2007 | Logan et al. |
| 2007/0192158 A1 | 8/2007 | Kim |
| 2007/0204338 A1 | 8/2007 | Aiello et al. |
| 2007/0226810 A1 | 9/2007 | Hotti |
| 2007/0244996 A1 | 10/2007 | Ahmed et al. |
| 2007/0276905 A1 | 11/2007 | Durand et al. |
| 2007/0288612 A1 | 12/2007 | Hall |
| 2007/0294376 A1 | 12/2007 | Ayachitula et al. |
| 2007/0299951 A1 | 12/2007 | Krithivas |
| 2008/0028048 A1 | 1/2008 | Shekar CS et al. |
| 2008/0040452 A1 | 2/2008 | Rao et al. |
| 2008/0046708 A1 | 2/2008 | Fitzgerald et al. |
| 2008/0059959 A1 | 3/2008 | Chen et al. |
| 2008/0130639 A1 | 6/2008 | Costa-Requena et al. |
| 2008/0189693 A1 | 8/2008 | Pathak |
| 2008/0196043 A1 | 8/2008 | Feinleib et al. |
| 2008/0235266 A1 | 9/2008 | Huang et al. |
| 2008/0235361 A1 | 9/2008 | Crosbie et al. |
| 2008/0244325 A1 | 10/2008 | Tyulenev |
| 2008/0270674 A1 | 10/2008 | Ginzton |
| 2008/0288938 A1 | 11/2008 | DeHaan et al. |
| 2008/0288939 A1 | 11/2008 | DeHaan et al. |
| 2008/0294777 A1 | 11/2008 | Karve et al. |
| 2008/0301666 A1 | 12/2008 | Gordon et al. |
| 2008/0313716 A1 | 12/2008 | Park |
| 2008/0320110 A1 | 12/2008 | Pathak |
| 2008/0320472 A1 | 12/2008 | Laska et al. |
| 2009/0007091 A1 | 1/2009 | Appiah et al. |
| 2009/0055901 A1 | 2/2009 | Kumar et al. |
| 2009/0064132 A1 | 3/2009 | Suchy et al. |
| 2009/0089567 A1 | 4/2009 | Boland et al. |
| 2009/0089852 A1 | 4/2009 | Randolph et al. |
| 2009/0106291 A1 | 4/2009 | Ku et al. |
| 2009/0129597 A1 | 5/2009 | Zimmer et al. |
| 2009/0132682 A1 | 5/2009 | Counterman |
| 2009/0132710 A1 | 5/2009 | Pelley |
| 2009/0158148 A1 | 6/2009 | Vellanki et al. |
| 2009/0158272 A1 | 6/2009 | El-Assir et al. |
| 2009/0164522 A1 | 6/2009 | Fahey |
| 2009/0165099 A1 | 6/2009 | Eldar et al. |
| 2009/0172430 A1 | 7/2009 | Takenouchi |

| | | | |
|---|---|---|---|
| 2009/0240835 A1 | 9/2009 | Adelman et al. |
| 2009/0259665 A1 | 10/2009 | Howe et al. |
| 2009/0265707 A1 | 10/2009 | Goodman et al. |
| 2009/0282404 A1 | 11/2009 | Khandekar et al. |
| 2009/0285199 A1 | 11/2009 | Strahs et al. |
| 2009/0287913 A1 | 11/2009 | Woods et al. |
| 2010/0023740 A1 | 1/2010 | Moon et al. |
| 2010/0049838 A1 | 2/2010 | DeHaan et al. |
| 2010/0050169 A1 | 2/2010 | DeHaan et al. |
| 2010/0054156 A1 | 3/2010 | DeHaan et al. |
| 2010/0057833 A1 | 3/2010 | DeHaan et al. |
| 2010/0057890 A1 | 3/2010 | DeHaan et al. |
| 2010/0057913 A1 | 3/2010 | DeHaan et al. |
| 2010/0057930 A1 | 3/2010 | DeHaan et al. |
| 2010/0058307 A1 | 3/2010 | DeHaan et al. |
| 2010/0058327 A1 | 3/2010 | DeHaan et al. |
| 2010/0058328 A1 | 3/2010 | DeHaan et al. |
| 2010/0058330 A1 | 3/2010 | DeHaan et al. |
| 2010/0058332 A1 | 3/2010 | DeHaan et al. |
| 2010/0058444 A1 | 3/2010 | DeHaan et al. |
| 2010/0082799 A1 | 4/2010 | DeHaan et al. |
| 2010/0083245 A1 | 4/2010 | DeHaan et al. |
| 2010/0100876 A1 | 4/2010 | Glover et al. |
| 2010/0128639 A1 | 5/2010 | DeHaan et al. |
| 2010/0131648 A1 | 5/2010 | DeHaan et al. |
| 2010/0138521 A1 | 6/2010 | DeHaan et al. |
| 2010/0138526 A1 | 6/2010 | DeHaan et al. |
| 2010/0138696 A1 | 6/2010 | DeHaan et al. |
| 2010/0217837 A1 | 8/2010 | Ansari et al. |
| 2010/0217840 A1 | 8/2010 | DeHaan et al. |
| 2010/0217843 A1 | 8/2010 | DeHaan et al. |
| 2010/0217848 A1 | 8/2010 | DeHaan et al. |
| 2010/0217944 A1 | 8/2010 | DeHaan et al. |
| 2010/0218243 A1 | 8/2010 | DeHaan et al. |
| 2010/0220584 A1 | 9/2010 | DeHaan et al. |
| 2010/0223367 A1 | 9/2010 | DeHaan et al. |
| 2010/0223504 A1 | 9/2010 | DeHaan et al. |
| 2010/0223607 A1 | 9/2010 | DeHaan et al. |
| 2010/0223608 A1 | 9/2010 | DeHaan et al. |
| 2010/0223609 A1 | 9/2010 | DeHaan et al. |
| 2010/0223610 A1 | 9/2010 | DeHaan et al. |
| 2010/0250907 A1 | 9/2010 | DeHaan et al. |
| 2010/0306337 A1 | 12/2010 | DeHaan et al. |
| 2010/0306380 A1 | 12/2010 | DeHaan et al. |
| 2010/0333084 A1 | 12/2010 | DeHaan et al. |
| 2011/0131304 A1 | 6/2011 | Henson |
| 2011/0131384 A1 | 6/2011 | Henson |

OTHER PUBLICATIONS

Agarwalla et al., "Automating Provisioning of Complete Software Stack in a Grid Environment", 2004.*

Lockard et al., "Synctree for Single Point Installation, Upgrades, and OS Patches", 1998.*

Lumens, "pykickstart Programmer's Guide", Apr. 13, 2007.*

HP Storage Essentials SRM 6.0 Installation Guide, Jan. 2008, HP, 1st ed. Part No. T4283-96113, pp. 1-5, 97-136, 219-228.

HP Storage Essentials SRM 6.0 User Guide, Jan. 2008, HP, 1st ed. Part No. T4238-96114, pp. 1-83.

Michael DeHaan, "Unified Provisioning", 2007.

Michael DeHaan, "Provisioning With Cobbler", 2007.

Tan et al. "A WBEM Basked Disk Array Management Provider", 2005, IEEE, 2005 International Conference on Cyberworlds.

Lovelace et al. Managing Disk Subsystems using IBM TotalStorage Productivity Center, Sep. 2005, IBM, 2nd ed. SG24-7097-01, pp. 1-42.

Doc Searls "Linus for Suits", 2005, Specialized System Consultants Inc., vol. 2005.

eBook "Microsoft System Management Server 2003 Administrator's companion", Microsoft Press, c2004, Ch. 13, Patch Management, pp. 471-507.

Butt et al., "Automated Installation of Large-Scale Linus Networks", 2000.

Anderson et al., "Technologies for Large-Scale Configuration Management", Dec. 9, 2002.

Grosse, "Repository Mirroring", 1995.

USPTO; Office Action for U.S. Appl. No. 11/765,760, mailed May 11, 2011.

USPTO; Office Action for U.S. Appl. No. 11/765,760, mailed Nov. 28, 2011.

USPTO; Office Action for U.S. Appl. No. 11/765,760, mailed Mar. 13, 2012.

USPTO; Office Action for U.S. Appl. No. 11/765,760, mailed Jun. 18, 2012.

USPTO; Office Action for U.S. Appl. No. 11/765,760, mailed Oct. 1, 2012.

USPTO; Office Action for U.S. Appl. No. 12/414,941, mailed Oct. 14, 2011.

USPTO; Office Action for U.S. Appl. No. 12/414,941, mailed Mar. 20, 2012.

USPTO; Office Action for U.S. Appl. No. 12/414,941, mailed Sep. 10, 2012.

USPTO; Notice of Allowance for U.S. Appl. No. 12/414,941, mailed Dec. 10, 2012.

* cited by examiner

METHODS AND SYSTEMS FOR DYNAMICALLY GENERATING INSTALLATION CONFIGURATION FILES FOR SOFTWARE

FIELD OF THE INVENTION

The present invention relates to software provisioning.

BACKGROUND OF THE INVENTION

Today, there are several automation frameworks currently deployed that support software provisioning, for example, for installation testing of software. Each framework encounters similar obstacles, such as test scheduling, results storage/reporting, environment initialization and test case design. Often times, the implementations to overcome similar problems are divergent.

Most automation frameworks must address the issue of system initialization. A common method for addressing this on Anaconda-based Linux distributions is by performing a fresh product installation using a set of hand crafted kickstart files. While this method works fairly well once established, it suffers from several problems.

First, before any system is made available, a kickstart template must be created for each applicable test release. To obtain this file, every applicable test release must be installed and the resulting /root/anaconda-ks.cfg file can then be used as the kickstart template for all future installs of that release for that test system. This is a time consuming processing.

Second, as the number of systems in the test pool increases, the number of kickstart files to maintain grows significantly. This translates to hand-maintaining a large number of kickstart template files. Thus, when a situation arises where an installation workaround is required, the number of kickstart files requiring updates is significant.

Accordingly, it would be desirable to provide a tool that makes installation testing simpler for the end-user. It would also be desirable to provide a tool that helps automate installation testing.

BRIEF DESCRIPTION OF THE DRAWINGS

The accompanying drawings, which are incorporated in and constitute a part of this specification, illustrate embodiments of the invention and together with the description, serve to explain the principles of the invention. In the figures.

DESCRIPTION OF THE EMBODIMENTS

The present invention provides methods and systems for dynamically generating installation configuration files, such as kickstart files for Linux distributions, which may be used for installing software or for software installation testing. In some embodiments, the present invention is implemented for generating kickstart files for Anaconda-based Linux distributions. In particular, the present invention employs a framework comprising an API to discover and monitor an inventory of distributions, a set of templates for the configuration files, and plugins that may be selectively invoked to customize the configuration files.

When performing installation testing, a server will receive a test request, access the distribution inventory, and select appropriate templates that are to be part of the test. The server will then automatically generate the installation configuration files from a template. In some instances, the generated configuration files may require customization. Accordingly, the server may execute one or more plugins that modify the configuration files as desired. Small client applications run on the target machines of the installation tests and work with the server to download the configuration files and the distributions. The present invention may also employ a scheduling service to coordinate the operations of the server and target machines.

The present invention may be applied to installation and installation testing of any form of software, such as Windows systems, UNIX systems, and Linux systems. For purposes of illustration, the present invention will now be explained with reference to implementation to Linux systems, such as Fedora and Red Hat Enterprise Linux by Red Hat, Inc.

Figure 1:
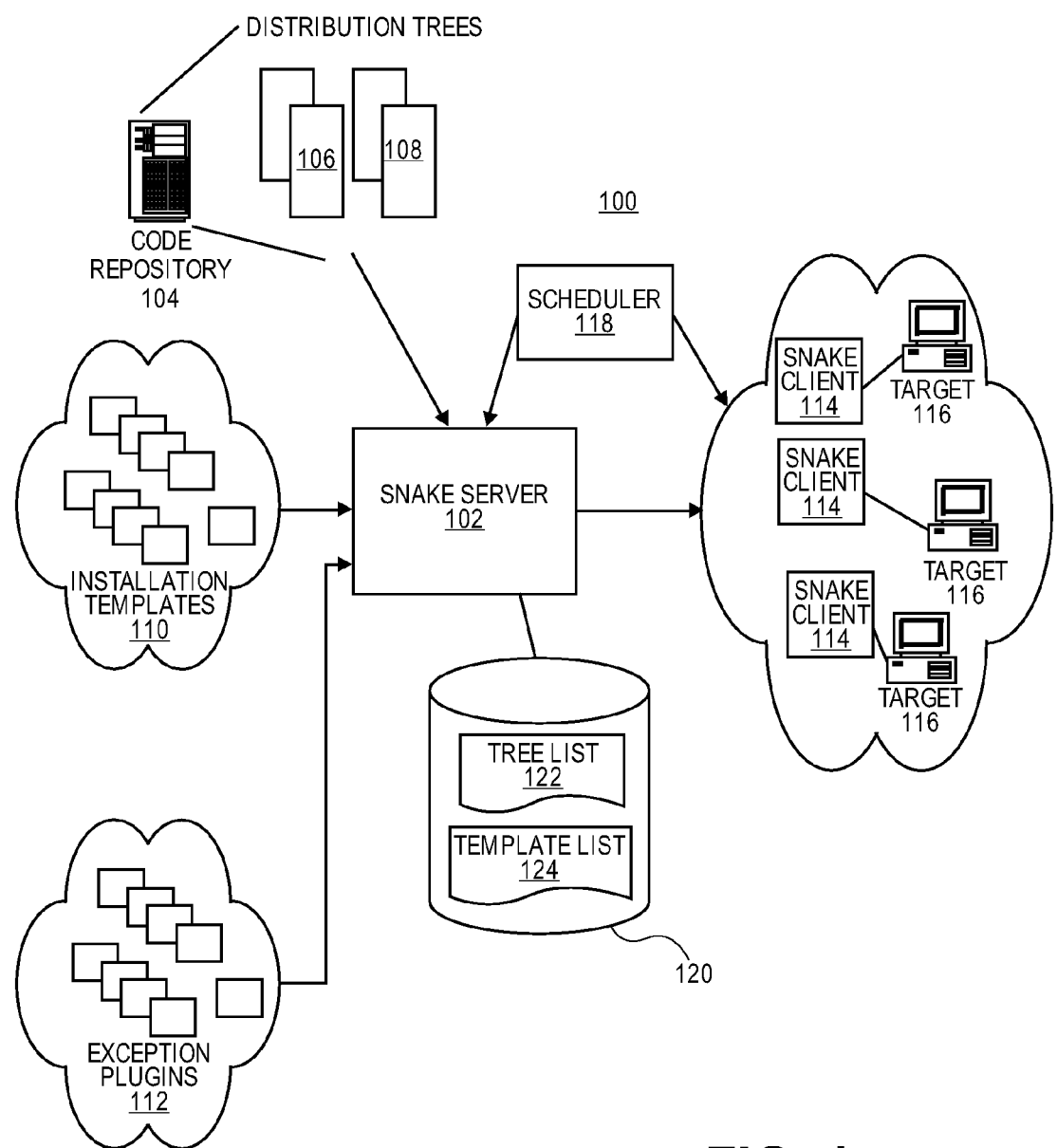
FIG. 1 illustrates an exemplary system in which the present invention may be employed.
Figure 2:
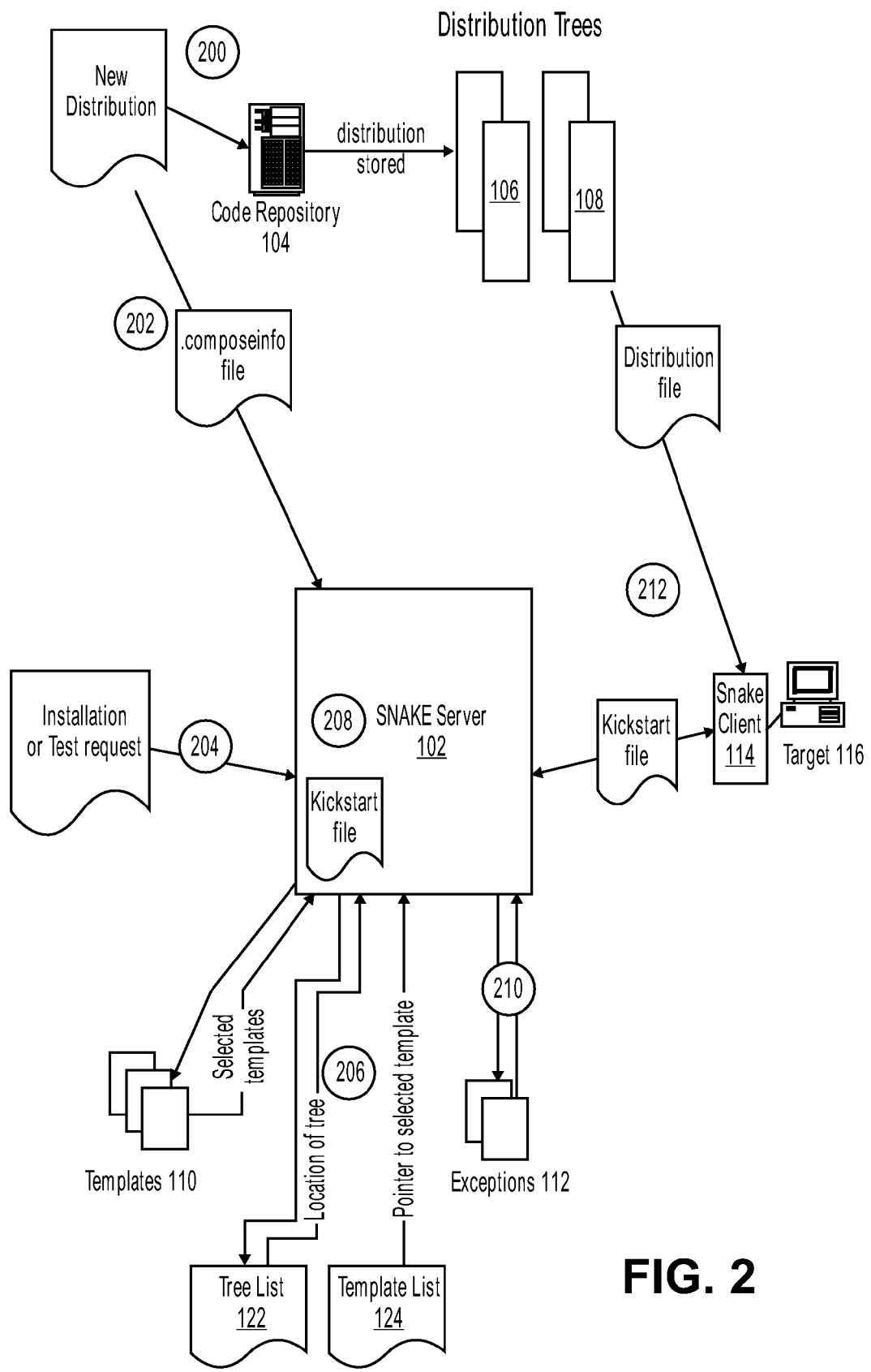
FIG. 2 illustrates an exemplary process flow for conducting installation testing in accordance with the present invention.

Accordingly, the description will first provide some general information about Linux installations. Next, FIG. 1 is presented to explain an exemplary system of the present invention. Finally, FIG. 2 is provided to illustrate a general process flow for installation testing used in the present invention. In the figures, wherever possible, the same reference numbers will be used throughout to refer to the same or like parts.

Turning now to the subject of Linux installations, many system administrators use what is known as the "kickstart" installation method. Kickstart files are files that specify the intended configuration of the software being provisioned. Kickstart files can be kept on a server and can be read by individual computers during the installation. This installation method allows the use of a single or relatively few standard kickstart files to install Linux on multiple machines, making it ideal for network and system administrators.

The kickstart file is a simple text file, containing a list of items, each identified by a keyword. In general, a kickstart file can be edited with any text editor or word processor that can save files as ASCII text. Typically, kickstart files specify parameters related to: language selection; mouse configuration; keyboard selection; boot loader installation; disk partitioning; network configuration; NIS, LDAP, Kerberos, Hesiod, and Samba authentication; firewall configuration; and package selection. One skilled in the art will recognize that the present invention may be applied to non-kickstart files in Linux provisioning. For example, configuration files, such as AutoYAST Answer files used in Novell SuSe Linux and Sun Solaris Jumpstart files, may also be used by the present invention.

Kickstart files can be made available over a network using protocols, such as NFS, FTP, or HTTP, to support network-based installations. In the present invention, the network-based approach is employed to conduct installation testing on one or more networked target machines. If desired, however, the present invention may utilize kickstart installations using a local CD-ROM, local DVD, or a local hard drive. Reference will now be made in detail to the exemplary embodiments of the invention, which are illustrated in the accompanying drawings.

Referring now to FIG. 1, an exemplary system 100 that is consistent with the present invention is shown. The system 100 may comprise a server 102, a code repository 104 which provides access to distribution trees 106 and 108, a set of installation templates 110, a set of exception plugins 112, clients 114 running on target machines 116, a scheduler 118, and a configuration database 120, which comprises a distribution tree list 122 and template list 124. Each of these components will now be further described.

Server (from herein referred to as a "SNAKE" server for Smart Network Automated Kickstart Environment) 102 is responsible for: serving as an extensible markup language remote procedure call (XMLRPC) handler; retrieving install distribution trees 106 and 108; hosting kickstart templates 110 and plugins 112; and generating installation configuration files, i.e., kickstart files. SNAKE server 102 may be implemented as software, such as Python code, running on conventional server hardware or some other suitable computing device. Such devices are well known to those skilled in the art.

In order to control its operations, SNAKE server 102 may provide a command line interface that allows a user to enter various commands, such as commands for triggering the generation of kickstart files for an installation or installation test. Alternatively, with its XMLRPC handler, SNAKE server 102 may support RPCs from remote devices, such as clients 114. RPCs that may be supported are RPCs for: listing templates 110; listing distribution trees 106 or 108; generating one or more kickstart files; generating the command line interface, and registering one or more of target machines 116. Of course, SNAKE server 102 may be implemented with other types of interfaces, such as a graphical user interface. The primary function and responsibilities of server 102 will now be further described.

In order to retrieve one or more of installation trees 106 and 108, server 102 may implement an API. Accordingly, as distributions are written and stored at code repository 104, code repository 104 (or other device) may provide an information file via the API. For example, any product built by pungi, will write out a .composeinfo file that indicates what deliverables are associated with that product. Pungi is a well known open source program that spins Linux distribution trees and "isos" (disk images of an ISO 9660 file system for CD-ROMs). Other tools for creating distribution trees and isos may also be employed by the present invention.

The contents of a sample .composeinfo file are shown below:

```
tree: 6.91/Prime/i386/os
tree: 6.91/Prime/x86_64/os
tree: 6.91/Prime/ppc/os
dvdset: 6.91/Prime/i386/iso/F-6.91-i386-DVD.iso
dvdset: 6.91/Prime/x86_64/iso/F-6.91-x86_64-DVD.iso
dvdset: 6.91/Prime/ppc/iso/F-6.91-ppc-DVD.iso
dvdset: 6.91/source/iso/F-6.91-source-DVD.iso
```

This indicates that the compose distribution supplies 3 trees and several DVD images. For additional details on the tree, server 102 may follow the path noted and examine the contents of the .treeinfo file generated by anaconda. Anaconda is a well known open source installer for Red Hat Linux and Fedora Core. Anaconda is capable of using a kickstart file to automatically configure the installation, allowing users to run it with minimal supervision. Of course, other installers similar to anaconda may be employed by the present invention.

The contents of a sample .treeinfo file are shown below:

```
[general]
family = Fedora
timestamp = 1172549418.35
variant = Prime
totaldiscs = 1
```

-continued

```
version = 6.91
discnum = 1
packagedir = Fedora
arch = i386
[images-i586]
kernel = images/pxeboot/vmlinuz
initrd = images/pxeboot/initrd.img
boot.iso = images/boot.iso
diskboot.img = images/diskboot.img
[images-xen]
kernel = images/xen/vmlinuz
initrd = images/xen/initrd.img
```

Alternatively, server 102 may execute various scripts to scan nfs mounted directories in order to determine the type of product and locate bootable images on its shared network file system. Typically, these scripts may provide what is known as a .discinfo file, which provides of the same information as the .treeinfo file noted above.

Server 102 may host templates 110 and plugins 112 using known technology. For example, server 102 may be coupled to one or more databases (not shown) via a local network or wide area network. Alternatively, server 102 may be coupled to a local storage network to host templates 110 and plugins 112.

Server 102 may implement various access mechanisms to protect or segregate templates 110 and plugins 112. For example, in an environment where multiple users or entities are performing installations and testing, server 102 may support multiple template and plugin repositories. This feature allows server 102 to host templates and plugins for multiple organizations and users, yet still provides a security mechanism if desired. For example, the templates and plugins for a company "A" may be kept private from other users. Alternatively, templates and plugins for a company "B" may be public or accessible to others. The present invention may employ a wide variety of these types of features using well known technology.

In order to generate kickstart files, SNAKE server 102 may employ what is known as the pykickstart utility. Pykickstart is software that is able to accurately distinguish and generate valid grammar for the kickstart language from templates 110. Of course, any software that is capable of generating configuration files, such as kickstart files, from a template may be used by the present invention. The other components shown in FIG. 1 will now be described.

Code repository 104 is responsible for hosting distribution trees 106 and 108. Code repository 104 may be implemented using well known components of hardware and software.

Distributions 106 and 108 are bundles of software that are already compiled and configured. Distributions 106 and 108 may be in the form of formats such as rpm, deb, tgz, msi, exe, etc. For Linux, distributions 106 and 108 are bundles of software that comprise the Linux kernel, the non-kernel parts of the operating system, and assorted other software. Distributions 106 and 108 may take a variety of forms, from fully-featured desktop and server operating systems to minimal environments.

Installation templates 110 are pre-formatted, generic files from which kickstart files can be generated. Templates 110 may be of several types, such as minimal, everything, default, etc. An example of a minimal template is shown below:

```
from defaults import Defaults
def ks(**context):
    """Install the default package set."""
```

```
ks=Defaults( )
ks.packages.default = True
return ks
```

Exception plugins 112 comprise program code for customizing kickstart files for cases when special circumstances are required. For example, Fedora Core 6 (FC6) introduced IPv6 support in its installer. A plugin may be used to enable or disable use of IPv6. Any such type of circumstance may be accounted for by the present invention. Other circumstances for plugins 112 are known to those skilled in the art.

Client 114 assists SNAKE server 102 in performing installations. Client 114 is installed on target machines 116 and establishes communications with SNAKE server 102. Client 114 then downloads the distributions bootable installation images and the kickstart files from the SNAKE server 102. In some embodiments, client 114 is written in Python code to accommodate a variety of operating systems, machine architectures, etc.

Target machines 116 represent the particular machines to which software provisioning is directed. Target machines 116 may represent a wide variety of devices, such as a personal computer, a server, etc.

Although FIG. 1 shows relatively few number of target machines, the present invention is capable of managing a wide range environments, such as datacenters with thousands of machines or server pools with just a few machines.

Scheduler 118 assists in coordinating installation provisioning on target machines 116. For example, scheduler 118 may access a database of registered target machines 116, for example, on database 120 (not shown). Scheduler 118 may then be configured to find applicable subsets of target machines 116 to schedule software installations against one or more of templates 110.

Configuration database 120 serves as data storage for hosting the data used by SNAKE server 102. For example, as shown, configuration database 120 will typically comprise a distribution tree list 122 and a template list 124.

Distribution tree list 122 provides an inventory of distributions 106 and 108 that are hosted by SNAKE server 102. Accordingly, tree list 122 will comprise information about the nature and location of distributions, such those stored by code repository 104. This information may include, for example, a name of the tree, a location, version information, and the like.

Template list 124 provides an inventory of templates 110 that are hosted by SNAKE server 102. Accordingly, template list 124 will comprise information about the nature and location of the templates hosted by server 102. For example, this information may include a name of the template, a location, a version, an architecture, and the like. Those skilled in the art should recognize that configuration database 120 may employ a variety of data structures, such as relational database tables, and object oriented data structures. Therefore, use of the word "list" above is merely explanatory and not meant to limit the data structure used to store the list.

Reference is now made to FIG. 2, which illustrates the process flows of the present invention. As shown, in phase 200, a new distribution is submitted to code repository 104. For example, a user or developer (not shown) may create the new distribution using the Pungi and Anaconda tools to spin this new distribution on to code repository 104.

In phase 202, server 102 receives information about the new distribution and updates its tree list 122. For example, server 102 may access the .composeinfo file, which was generated by the Pungi tool. Server 102 may also follows the path noted in .composeinfo file and examine the contents of the .treeinfo file generated by anaconda for further information. Server 102 then updates its tree list 122. Server 102 may record all or some of the information in these files in tree list 122.

In phase 204, server 102 receives a request for a software installation or installation test. For example, server 102 may receive the request via its command line interface or via its XMLRPC handler. The request may come in various forms, such as a file or script, and may include other information, such as test parameters and the like. Typically, the request will specify a distribution (or multiple distributions) and information indicating one or more desired targets of the installation or test. The desired targets may be specified several ways, such as by processor architecture, network interfaces, file system, etc.

In phase 206, server 102 locates the distribution or distributions of the request and selects the appropriate templates 110 for the request. For example, server 102 may refer to its tree list 122 to determine the location of the distribution at code repository 104. In addition, server 102 may refer to template list 124 and determine which of templates 110 should be used for the requested installation. Alternatively, server 102 may execute a script for scanning the directories of networked file systems.

Server 102 may employ various criteria to select templates 110. Examples of criteria that may be used include: the identity of the user or entity requesting the installation or test; information in the request; and the availability of test machines 116.

In phase 208, server 102 generates the installation configuration files, e.g., kickstart files based on the selected template 110. For example, server 102 may employ the pykickstart utility to generate kickstart files from templates 110.

Of note, server 102 may generate any number of kickstart files from templates 110. For example, for installation testing, server 102 may be configured to generate a range of kickstart files to test that a distribution can install across a variety of different types of target machines 116. The range of scope of the kickstart files may be specified manually (for example, via the command line interface or RPC), information in the request, or from a test plan or test script running on server 102.

In phase 210, server 102 may optionally customize the kickstart files. In the present invention, server 102 may customize the kickstart files by executing one or more of plugins 112. Server 102 may simply iterate through all of plugins 112 and rely on conditional logic within the plugins 112 to determine if they should be executed. Alternatively, server 102 may include a utility or program that assists it in selecting plugins 112. Such mechanisms are well known to those skilled in the art.

Should one wish to disable support of IPv6 for all installs of Fedora Core 6 or newer, the following plugin could be executed to customize kickstart files:

```
def kernel_args_hook(args,**context):
    if context['ks'].version >= FC6:
        args.append('noipv6')
    return arg
```

In phase 212, the requested distribution and associated kickstart files are provided to target machines 116. For example, a user may be running clients 114 on target machines 116 and may use RPCs to request download of boot media and kickstart files from server 102. Upon receiving these files, clients 114 may then configure the installation of the requested distribution based on the kickstart file.

Alternatively, server 102 may "push" distributions and kickstart files to perform the installation or test. For example, clients 114 may register their target machines 116 with server 102. Server 102 may then initiate communications with clients 114 and send kickstart and distribution files to target machines 116.

As another alternative, scheduler 118 may work with both server 102 and clients 114 to schedule installation on target machines 116. Upon request, scheduler 118 may find applicable subsets of target machines 116 to schedule software installations against one or more of templates 110.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method comprising:
   receiving, by a server comprising hardware, a request for installation of a distribution of an operating system on a target machine;
   identifying, by the server, a template for installation of the distribution; and
   generating by the server, based on the template and a test plan, an installation configuration file for the distribution.

2. The method of claim 1, wherein the interface comprises a command line interface and wherein receiving the request comprises receiving a request via the command line interface.

3. The method of claim 1, wherein the server executes an extensible markup language (XML) remote procedure call (RPC) handler.

4. The method of claim 1, wherein the server executes a pykickstart utility to generate the installation configuration file.

5. The method of claim 1, wherein the server executes a utility to generate a kickstart file for the operating system.

6. The method of claim 1, wherein the server executes a plugin to customize the installation configuration file.

7. The method of claim 1, wherein the server executes a Python utility.

8. The method of claim 1, wherein the server stores a composeinfo file that specifies distributions accessible to the server.

9. The method of claim 1, wherein the server stores a treeinfo file that specifies distributions accessible to the server.

10. A system comprising:
    a repository comprising hardware to store a distribution of an operating system; and
    a server comprising hardware to:
      receive a request for installation of the distribution on a target machine,
      identify a template for installation of the distribution, and
      generate, based on the template and a test plan, an installation configuration file for the distribution.

11. The system of claim 10, wherein the server is configured to generate kickstart files.

12. The system of claim 10, wherein the target machine executes a Python application.

13. The system of claim 10, wherein the server executes a scheduler to schedule installations on the target machine.

14. The system of claim 10, wherein the server is configured to provide an application programming interface to receive information about distributions stored by the repository.

15. The system of claim 14, wherein the server is configured to receive a Pungi composeinfo file.

16. The system of claim 14, wherein the server is configured to receive an Anaconda treeinfo file.

17. The system of claim 14, wherein the server is configured to execute a script to scan the repository.

18. The system of claim 10, wherein the server is configured to execute a set of plugins that customize the installation configuration files.

* * * * *